(12) United States Patent  
Gatmir-Motahari et al.

(10) Patent No.: US 8,412,234 B1  
(45) Date of Patent: Apr. 2, 2013

(54) CLUSTERING LOCATION AND TIME FOR LOCATION PREDICTION

(75) Inventors: Sara Gatmir-Motahari, Millbrae, CA (US); Phyllis Reuther, Woodside, CA (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 13/313,741

(22) Filed: Dec. 7, 2011

(51) Int. Cl.  
*H04W 24/00* (2009.01)

(52) U.S. Cl. .............. 455/456.1; 370/395.4; 340/539.13

(58) Field of Classification Search ................... 455/273, 455/139, 276.1; 705/7.17; 714/54; 342/125, 342/450; 340/538.16, 870.28; 370/395.4, 370/428, 537  
See application file for complete search history.

(56) References Cited

U.S. PATENT DOCUMENTS

| | | | | |
|---|---|---|---|---|
| 5,526,345 A * | 6/1996 | Wallmeier | ............. | 370/395.4 |
| 5,842,216 A * | 11/1998 | Anderson et al. | ............. | 1/1 |
| 6,249,252 B1 * | 6/2001 | Dupray | ............. | 342/450 |
| 7,110,858 B2 * | 9/2006 | Pisarsky | ............. | 700/238 |
| 2009/0125321 A1 * | 5/2009 | Charlebois et al. | ............. | 705/1 |
| 2009/0254971 A1 * | 10/2009 | Herz et al. | ............. | 726/1 |
| 2011/0260860 A1 * | 10/2011 | Gupta | ............. | 340/539.13 |

* cited by examiner

*Primary Examiner* — Mahendra Patel (57) ABSTRACT

The invention is directed to methods for predicting future locations based on time clustering. Historical location data from a particular period of time is used to identify locations or places. The period of time is divided into even time slots. For each time slot, a probability distribution is computed by calculating a probability that the mobile device is located at each identified location during that time slot. The time slots are clustered into time slot groups based on similar probability distributions. For each time slot group, a probability distribution is calculated representing a probability that the mobile device is present at each location during the period of time defined by the time slot group.

19 Claims, 7 Drawing Sheets

| CLUSTER | TIMING | LIKELY EXPLANATION |
|---|---|---|
| 1 | EVERY DAY 1 AM TO 6 AM | ALWAYS ASLEEP AT HOME |
| 2 | WEEKDAYS 8 AM TO 5 PM | WORK HOURS |
| 3 | WEEKDAYS AROUND NOON | LUNCH HOUR |
| 4 | WEEKDAYS 6 AM TO 8 AM AND 5 PM TO 6 PM | COMMUTE HOURS |
| 5 | SUNDAY AFTERNOON | WEEKEND IRREGULARITY |
| 6 | ALL OTHER DAYS AND TIMES | MOSTLY, BUT NOT ALWAYS AT HOME |

CLUSTERING LOCATION AND TIME FOR LOCATION PREDICTION

SUMMARY

A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods for predicting future locations of a user through the location of the user's mobile device based on time clustering. Several methods may be used to cluster time slots that form a predetermined period of time (e.g., one week). Using naïve time division, for example, time slots are clustered into predetermined time-slot groups, such as, for example, weekday work hours, weekday nonwork hours, and weekends. Alternatively, intelligent time division clusters time slots based on location probability distributions calculated for each time slot. The probability distributions indicate how likely it is that the mobile device will be present at each identified location for a particular time slot.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

AGPS Assisted Global Positioning System
CDMA Code Division Multiple Access
GPRS General Packet Radio Service
GPS Global Positioning System
GSM Global System for Mobile communications (Groupe Spécial Mobile)
HTTP Hypertext Transfer Protocol
LED Light Emitting Diode
PDA Personal Data Assistant
TDMA Time Division Multiple Access
UMTS Universal Mobile Telecommunications System Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed to using historical data clustering to predict future locations of a mobile device, and thus a user. For example, a particular period of time, such as a week, is divided up into time slots, such as time slots of equal duration (e.g., one hour each). A probability distribution may be computed for each time slot so that the time slots can be clustered based on similar probability distributions. Once grouped or clustered into time-slot groups, a probability distribution is once again computed to determine the likelihood that the mobile device is present at each location for the duration of time that comprises each time-slot group. This information can be used to predict future locations of the user by way of the location of the mobile device.

In a first aspect of the present invention, one or more computer-readable media are provided having computer-executable instructions embodied thereon that, when executed, enable a computing device to perform a method of predicting a location based on time clustering. The method includes providing location data for a particular mobile device over a predetermined period of time, identifying one or more locations from the location data, and dividing the predetermined period of time into a plurality of time slots. For each of the plurality of time slots, the method includes calculating a probability distribution representing a probability that the mobile device is located at each of the one or more locations. Additionally, the method includes clustering the plurality of time slots into one or more time-slot groups based on the probability distributions and for each of the one or more time-slot groups, calculating the probability distribution representing the probability that the mobile device is located at each of the one or more locations.

In a second aspect of the present invention, one or more computer-readable media are provided having computer-executable instructions embodied thereon that, when executed, enable a computing device to perform a method of predicting a location based on time clustering. The method includes receiving location data for a particular mobile device, the location data corresponding to a predetermined period of time and dividing the location data into one or more location groups. Each of the one or more location groups represents a unique location where the mobile device was located during the predetermined period of time. The method additionally includes dividing the predetermined period of time into two or more time slots and clustering the two or more time slots into time-slot groups, wherein the time-slot groups include typical work hours of weekdays, non work hours of weekdays, and weekends. The method also includes for each of the time-slot groups, calculating the probability distribution representing the probability that the mobile device will be in each of the unique locations during the times in each of the time-slot groups.

In a third aspect of the present invention, a method for predicting a location based on time clustering is provided. The method includes utilizing historical location data associated with a particular mobile device to identify a plurality of locations where the mobile device has been located within a predetermined period of time and dividing the predetermined period of time into a plurality of time slots. Further, the method includes automatically computing a probability distribution for each time slot representing a probability that the mobile device is located at each of the plurality of locations throughout a duration of the time slot. Additionally, the method includes determining that a first time slot and a second time slot have a similar probability distribution, and associating the first time slot with the second time slot based on the similar probability distribution to create a first time cluster. For the first time cluster, the method includes automatically computing the probability distribution representing the probability that the mobile device is located at each of the plurality of locations throughout the duration of the time slots that comprise the first time cluster, wherein the probability distribution of the first time cluster is used to predict future locations of a user by way of the mobile device.

Figure 1:
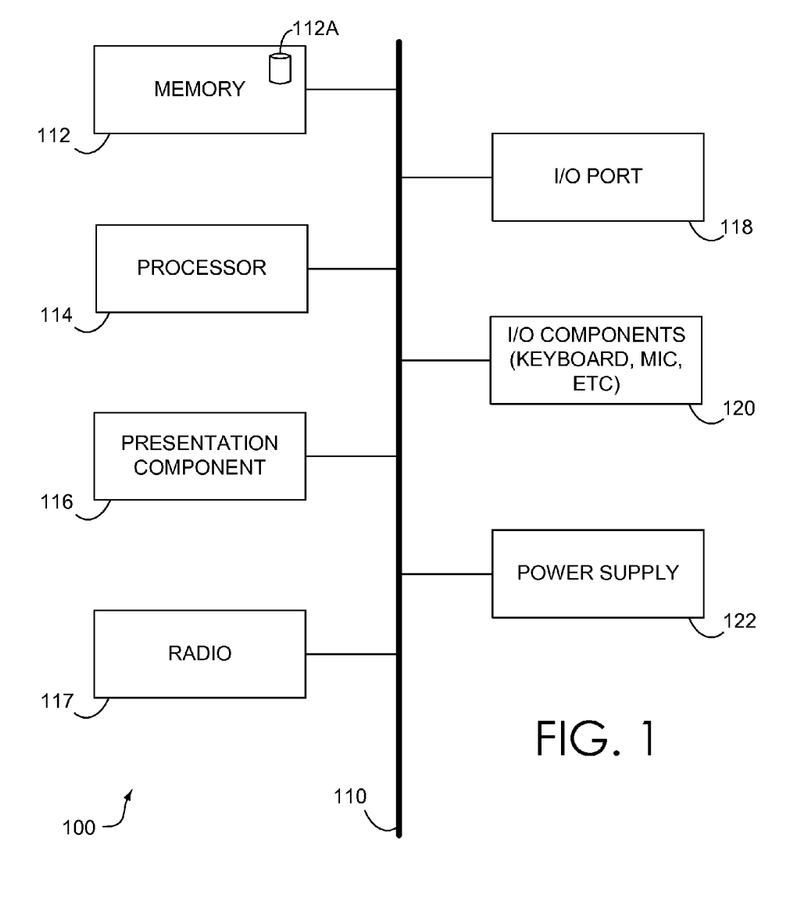
FIG. 1 depicts a block diagram of a mobile device in accordance with an embodiment of the present invention.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED) or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
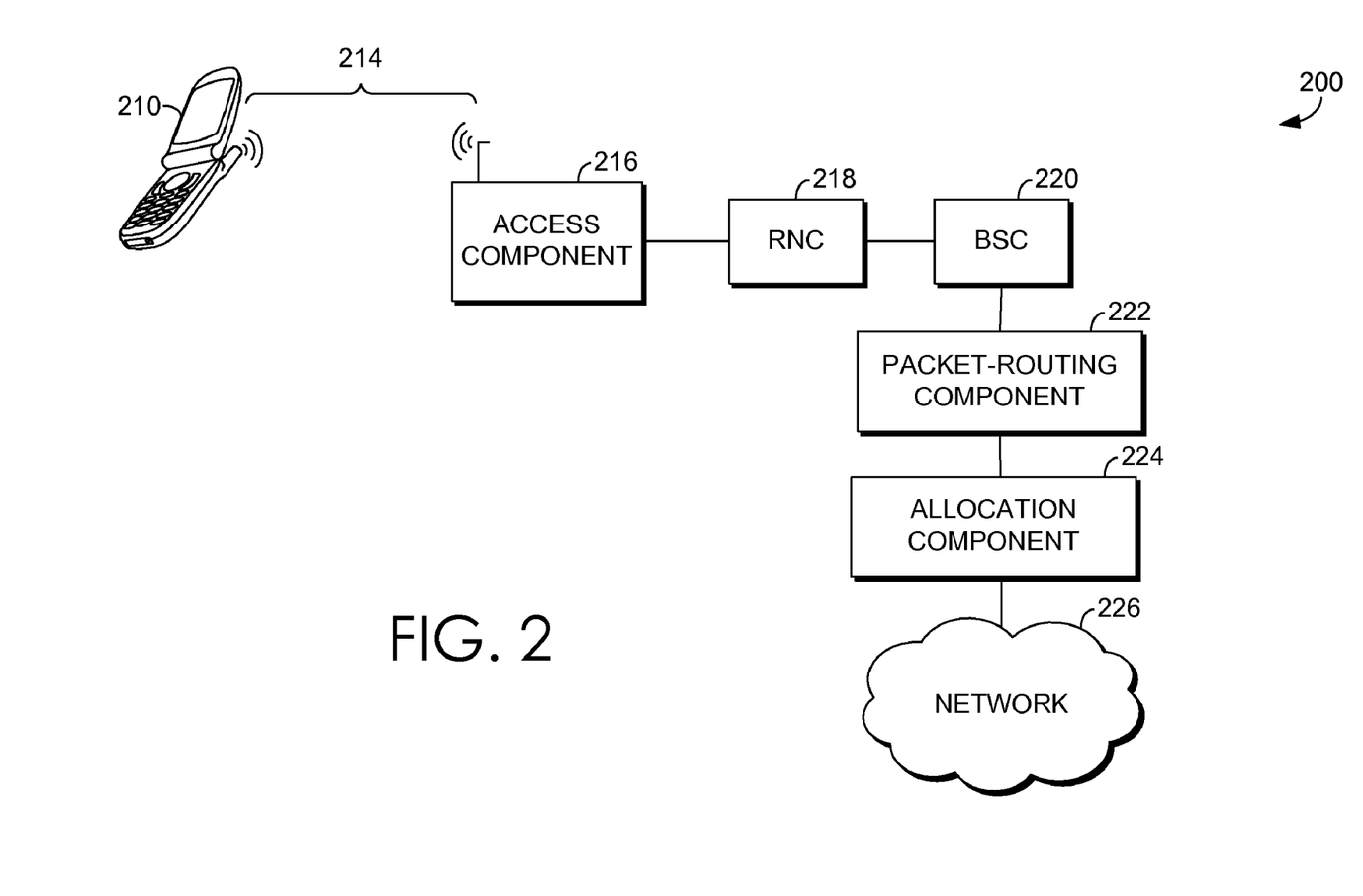
FIG. 2 depicts an illustrative operating system for carrying out embodiments of the present invention.

Turning now to FIG. 2, an illustrative operating environment is provided and referenced generally by the numeral 200, which depicts an illustrative networking environment that facilitates the communication of multiple wireless access components with each other. Mobile device 210 is the type of device described in connection with FIG. 1 in one embodiment. Mobile device 210 communicates with an access component 216 by way of a communications link 214. Communications link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using 802.11 protocol. This network is illustrated in FIG. 2 as item 226. A long-range connection may include a connection using one or more of CDMA, GPRS, GSM, TDMA, and 802.16.

Generally, the access component 216 provides access to what some skilled artisans refer to as a wireless communications network, also termed a core network, illustrated in FIG. 2 as network 226. A wireless communications network may comprise one or more of the components illustrated in FIG. 2. To the contrary, not all components that make up a wireless communications network are shown. Also, not all connections or possible connections are shown. The access component 216 may be one or more of a base transceiver station (BTS) tower, a Wireless access component, a Mobile Hotspot, and any other device that facilitates communication between mobile device 210 and network 226. In one embodiment, the access component 216 includes both a Wireless access component and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC acts as the intelligence behind base transceiver stations (BTS) and handles allocation of radio channels, receives measurements from mobile devices, and controls handovers from one BTS to another BTS. As such, the BSC 220 may receive location data from mobile devices that may have been measured using a global positioning system (GPS), an assisted GPS (AGPS), or network measurements, such as estimations of a mobile device's current location based on signal strength, power levels, etc., from the base stations. For example, data may be collected from network switches, as base stations gather data at the switch level.

The components illustrated in FIG. 2, such as those that may be included in a wireless communications network include a packet-routing component 222 and an allocation component 224. As mentioned, other components not shown here may also be used to carry out aspects of the present invention. For instance, a customer-profile database and an authentication component, such as an authentication, authorization, and accounting (AAA) server may be included in the wireless network, although not shown in FIG. 2. Further, several components shown in FIG. 2 may be combined into a single component although shown separately in FIG. 2. A packet-routing component 222 may be known to those of ordinary skill in the art as a packet data serving node (PDSN), typically used in CDMA networks; a foreign agent (FA); a Local Mobility Anchor (LMA) used for PMIP functions in the PDSN for IPv6; or a serving GPRS support node (SGSN), typically used in GSM and UMTS networks. Additionally, an Access Service Network (ASN) gateway may be used and is typically used in WiMAX networks. The packet-routing component 222 acts as the serving point between the radio access and IP networks. It is responsible for managing point-to-point protocol (PPP) sessions between the mobile provider's core IP network 226 and the mobile device 210. At a high level, the packet-routing component 222 helps provide access to the Internet as well as to other network technologies and application services. It helps provide mobile IP (MIP) access, one-agent support, and transportation of packets to facilitate the tunneling or communicating of data through virtual private networks. It can act as a client for an authentication server, which helps ensure that mobile device 210 is authorized to communicate via the wireless communications network.

In one embodiment, a Long Term Evolution radio network may be used, such that the access component 216 is a EUTRAN Node B. The BSC 220 is a Mobility Management Entity. Further, in this embodiment, the packet-routing component 222 is a Serving Gateway, the allocation component 224 is a Packet Data Network Gateway (P-GW), and the authentication component (not shown) is a Home Subscriber Server (HSS). In one embodiment, the packet-routing component 222 includes a set of computer-executable instructions that helps carry out various aspects of technology described herein. The allocation component 224 is responsible for allocating IP addresses to mobile devices. The allocation component 224, in one embodiment, is a home agent (e.g., HA).

Figure 3A:
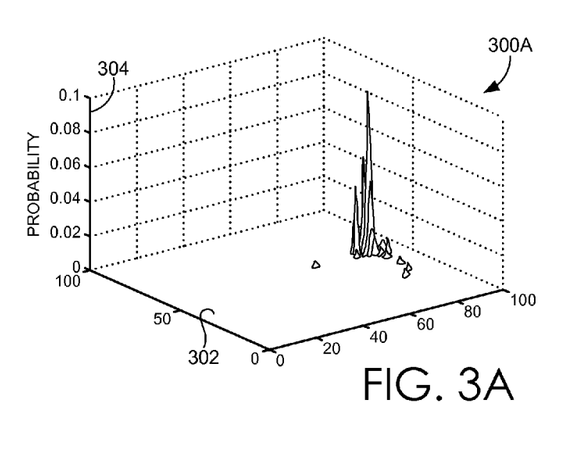
FIGS. 3A, 3B, and 3C depict three sample three-dimensional graphs of spatial probability distributions of a mobile device's location, in accordance with an embodiment of the present invention.
Figure 3B:
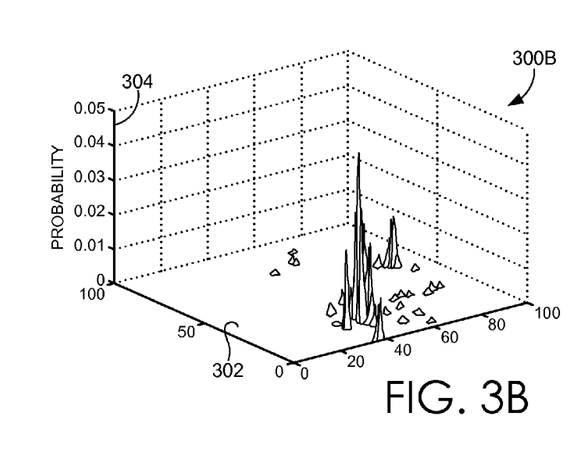
Figure 3C:
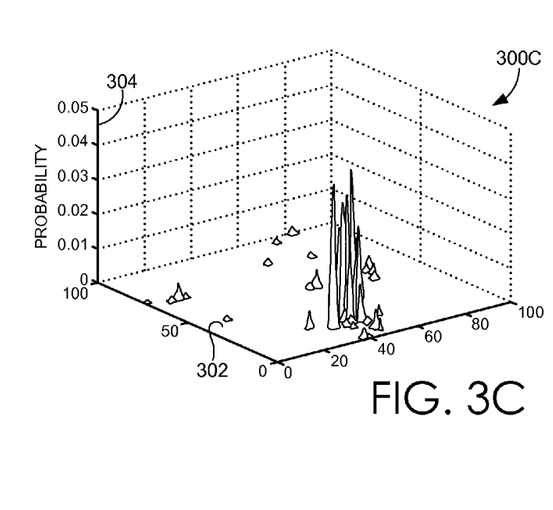

Turning now to FIGS. 3A, 3B, and 3C, charts of spatial probability distributions, numbered as 300A, 300B, and 300C, respectively, illustrate a mobile device's location in accordance with embodiments of the present invention. Initially, FIGS. 3A, 3B, and 3C illustrate probability distributions for work hours, non work hours, and weekends, respectively. Location data may be received from the network, and may be taken from a mobile device in a variety of ways, including, but not limited to, GPS, AGPS, and by taking network measurements (e.g., predicting location based on distance from base stations using power, signal strength, or the like). The location data may correspond to a particular period of time, such as one week, two weeks, three weeks, etc. While examples are given herein, other lengths of time may be used to carry out embodiments of the present invention. The location data may be taken and divided into clusters of locations or places. This dividing or clustering may be done algorithmically, such as hierarchical clustering based on Euclidian distance, for example.

The time on which the location data is based may then be divided into time slots. In one embodiment, the period of time is divided into hours of each day. As such, if the particular period of time is one week in duration and this duration of time is divided into hours, there would be 168 time slots. For each time slot, a probability distribution is computed of the locations identified. This indicates a probability that the mobile device, and as such the user of the mobile device, is at each identified location for each time slot. These time slots are then clustered based on their respective probability values of the probability distributions. Thus, time slots that fall under the same cluster have similar probability distributions. Again, this clustering of time slots may be done algorithmically by one of many algorithms, such as a hierarchical algorithm. Once again, probability distributions are computed of locations for each time cluster. These probability distributions can be used to predict future locations. One possible method of prediction is a maximum likelihood estimation, but other methods are also contemplated to be within the scope of the present invention.

There are two ways of clustering the time slots into time clusters, also referred to as time-slot groups. In one embodiment, time slots are clustered based on weekday work hours, weekday non work hours, and weekends. This type of clustering may be referred to as naïve time division. Another method of clustering time slots may be referred to as intelligent time division, where time slots are clustered for each mobile device based on the probability distributions of the identified locations using, for example, agglomerative hierarchical clustering. FIGS. 3A, 3B, and 3C illustrate location clustering during weekday work hours, weekday non work hours, and weekends, respectively. The x axis and the y axis of the three graphs shown represent location shown as a two-dimensional space 302, such as latitude and longitude measurements. The z axis 304 represents a probability that the user is physically located at a particular location (shown on the x and y axes). As such, the graphs show a spatial probability distribution of a mobile device's location. The peak in the graph indicates the location having the highest probability that the mobile device will be located there at a particular time (duration of the time slot).

Figure 4:
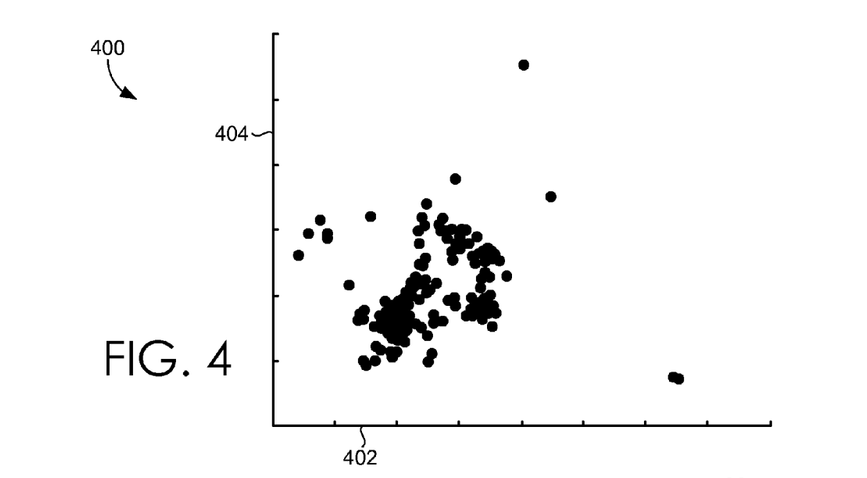
FIG. 4 depicts a graph illustrating an example of clustered locations, in accordance with an embodiment of the present invention.

Referring to FIG. 4, a graph 400 is depicted illustrating clustered locations, in accordance with an embodiment of the present invention. This graph illustrates a sample of clustered locations. For instance, when location points are plotted on a graph such as the graph shown in FIG. 4, multiple locations can be identified. For instance, points in a close, tight cluster may be determined to belong to the same location, such as if a location is a large hospital or a large office building, for example.

Figure 5:
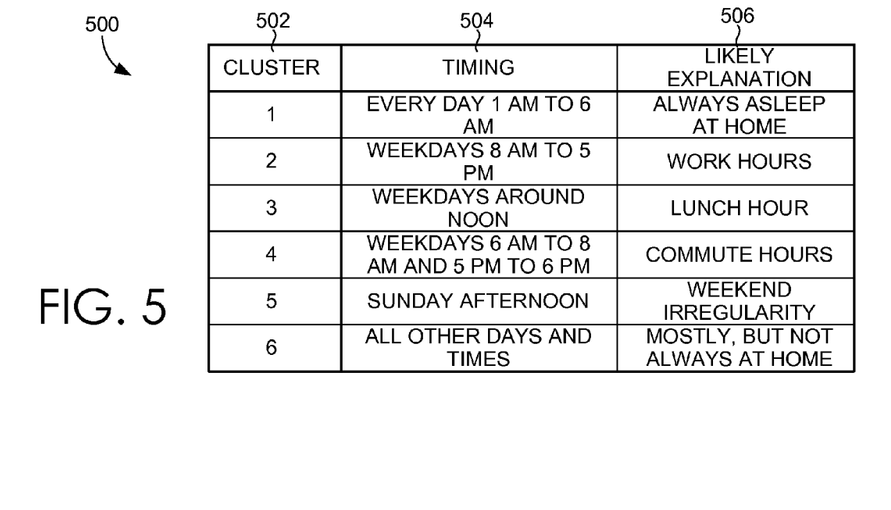
FIG. 5 depicts a sample table of clusters of time intervals for a mobile device using intelligent time division, in accordance with an embodiment of the present invention.

FIG. 5 depicts a table 500 of clusters of time intervals for a mobile device using intelligent time division, in accordance with an embodiment of the present invention. While FIGS. 3A, 3B, and 3C illustrate time divided into three groups, including weekday work hours, weekday non work hours, and weekends, the table 500 of FIG. 5 illustrates intelligent time division, as briefly described above. As such, instead of dividing up time into predetermined categories, time is divided into categories based on historical location information. As shown in FIG. 5, there are six time clusters. Each of the six time clusters 502 has a corresponding timing 504 element and a likely explanation 506. For example, cluster 1 corresponds to every day from 1:00 AM until 6:00 AM. For the particular user, this user is always asleep at home, and as such based on historical location information, it has been found that the user (based on the location of the mobile device) is always or mostly located at the user's home. For cluster 2 which corresponds to weekdays from 8:00 AM to 5:00 PM, there is a high probability that the user is at work. Weekdays around noon corresponding to cluster 3, the user's location may be highly varied. For cluster 4 corresponding to weekdays from 6:00 AM until 8:00 AM and from 5:00 PM to 6:00 PM, the user seems to be commuting to and from work based on variable locations from the home to work and vice versa. On Sunday afternoons corresponding to cluster 5, the user's locations are varied due to weekend irregularity. Finally, cluster 6 corresponds to all other days and times, where the user is mostly, but not always, at home. As mentioned, the six clusters shown in FIG. 5 correspond to a particular user of a mobile device, and as such may vary depending on the user and the user's typical schedule.

Figure 6:
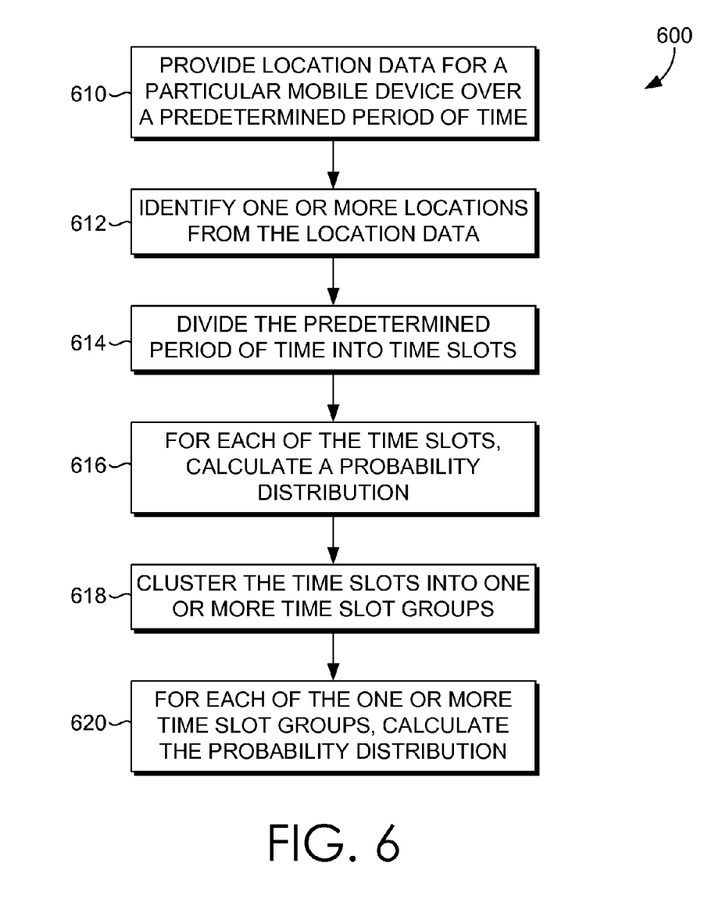
FIGS. 6-8 depict flowcharts illustrating methods for location prediction based on historical location information, in accordance with embodiments of the present invention.

FIG. 6 depicts a flowchart illustrating a method 600 for location prediction based on historical location information, in accordance with an embodiment of the present invention. Initially, at step 610, location data is provided for a particular mobile device over a predetermined period of time. In one embodiment, the predetermined period of time is one week, but in other embodiments, the predetermined period of time is five days, six days, etc. Location data may be collected from the mobile device by one of a variety of ways. For example, a GPS or AGPS may be used to determine locations of the mobile device at various times, such as when there is a mobile event associated with the mobile device. Another method of location capture is by using network measurements, including base stations or sectors of base stations to measure location. For instance, this method may utilize power or signal strength to calculate location. Other methods of location determination are also contemplated to be within the scope of the present invention. At step 612, one or more locations are identified from the location data. Location may be determined by, for example, clustering locations, or places. This clustering may be algorithmically performed such as by hierarchical clustering based on the Euclidian distance. This however, is just one example of how location data is clustered. In one embodiment, identifying locations from the location data may include grouping geographical points together based on their respective locations and determining a geographical place that represents each group of geographical points.

The predetermined period of time is divided into time slots at step 614. In one embodiment, the time slots are each one hour, but in other embodiments, the time slots may each be thirty minutes, two hours, three hours, etc. For instance, if the time slots are each one hour in length and the predetermined period of time is one week, there would be 168 time slots. At step 616, for each of the time slots, a probability distribution is calculated. The probability distribution represents a probability that the mobile device is located at each of the locations identified at step 612. As such, there are the same number of probability distributions calculated as there are time slots. For each time slot, a probability is calculated to produce a probability distribution. The probability distribution represents the probability of the user's presence (by way of the mobile device) at each location or place identified at step 612. The probability distribution is used to predict future locations of the mobile device. In one embodiment, the maximum likelihood estimation is used to predict future locations of the mobile device.

Now that a probability distribution has been calculated for each time slot, the time slots are clustered into time-slot groups at step 618 based on the probability distributions. As mentioned, there are multiple ways of clustering time, including a naïve time division and intelligent time division. When naïve time division is used, time slots are divided into predetermined time-slot groups. In one embodiment, naïve time division clusters time slots into weekday work hours, weekday non work hours, and weekends. This is just one example as to how time slots can be clustered into predetermined time-slot groups. Other groups are also contemplated to be within the scope of the present invention. Alternatively, if intelligent time division is used, the time-slot groups are not predetermined, but are determined based on probability distributions calculated for each time slot. Those time slots with the same or similar probability distributions are clustered together. In one embodiment, a first time slot is associated with a second time slot to form a first time slot group, such that the first and second time slots have the same or similar probability distributions. At step 620, for each time slot group, a probability that the mobile device is present at each location is computed to generate a probability distribution for each time slot group. While two time slots are described herein, the process may be iterative in that it is repeated likely with multiple time slots over a predetermined period of time. Therefore, after the first and second time slots are associated to each other, other time slots may also be associated with the first and second time slots based on their probability distributions.

Figure 7:
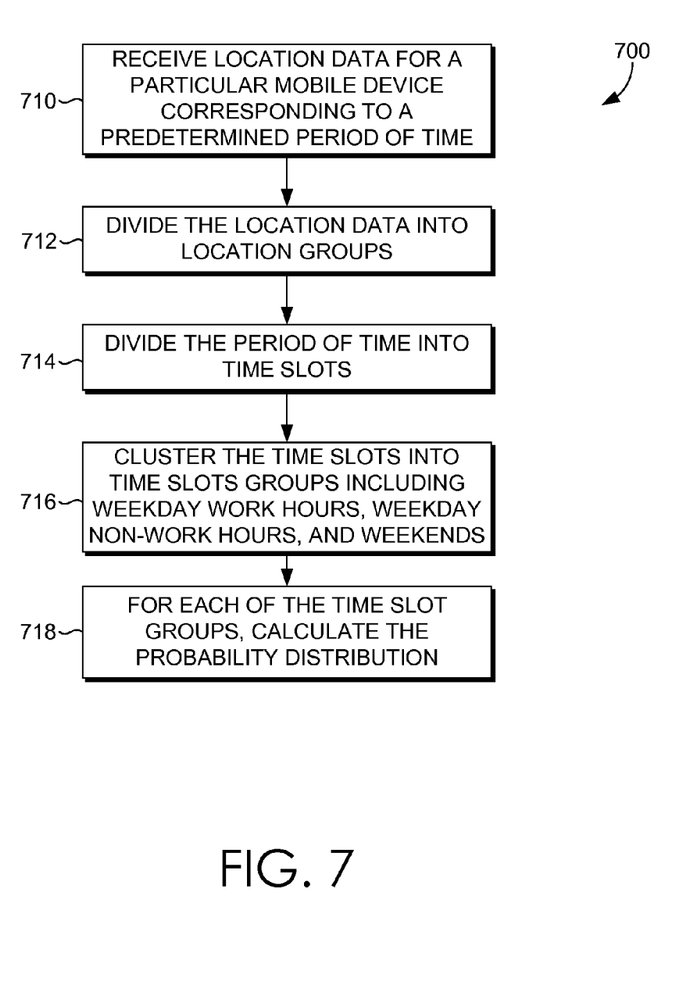
Figure 8:
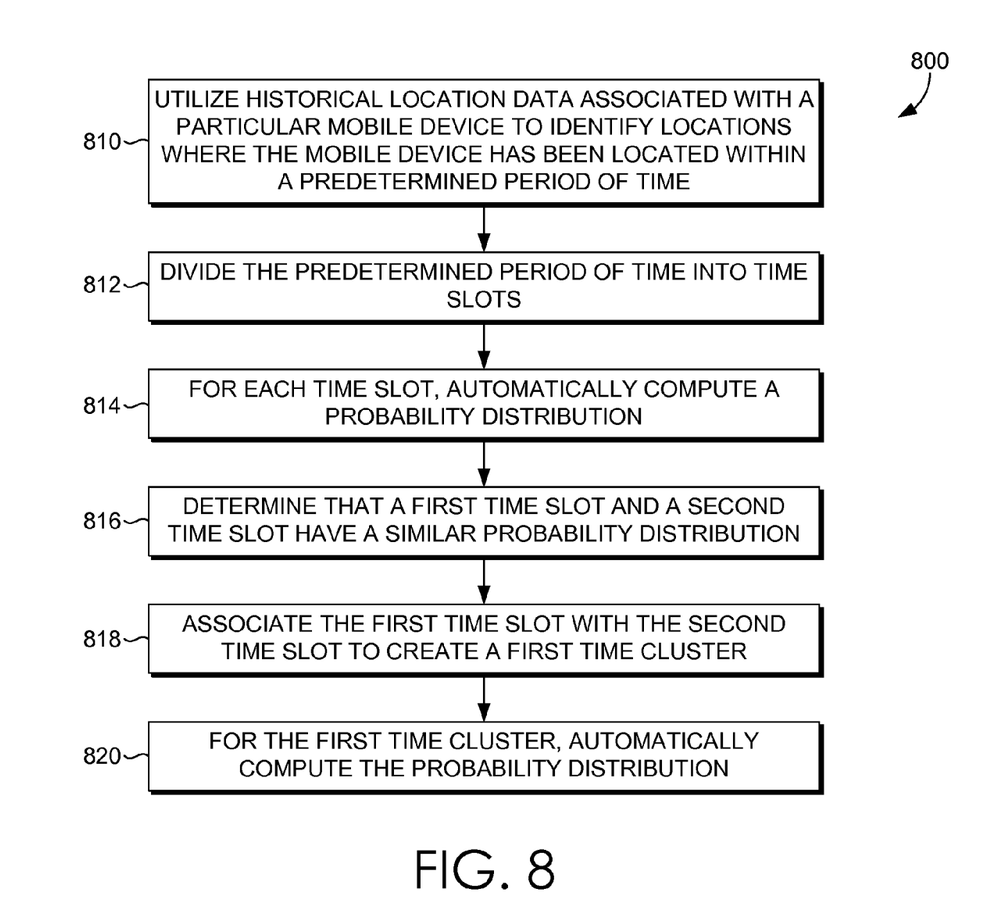

Turning to FIG. 7, a flowchart is depicted illustrating a method 700 for location prediction based on historical location information, in accordance with an embodiment of the present invention. While the embodiments of the methods of FIGS. 6 and 8 illustrate intelligent time division where time-slot groups are formed based on probability distributions of each time slot, the method of FIG. 7 illustrates naïve time division, as will become apparent as it is described. Initially at step 710, location data for a particular mobile device is received corresponding to a predetermined period of time. Location data may be received from the service provider associated with the mobile device, and may be collected from GPS, AGPS, network measurements, or the like. At step 712, the location data is divided into location groups, which may comprise spatially clustering data points from the location data to identify the location groups. The predetermined period of time is divided into time slots at step 714. At step 716, the time slots are clustered into time-slot groups, which, in one embodiment, includes the predetermined time-slot groups of weekday work hours, weekday non work hours, and weekends. Typically, the time slots in a time slot group have the same or similar probability distributions. For example, in one embodiment, a first time slot and a second time slot are determined to have similar probability distributions. Based on this, the first and second time slots form a first of the time-slot groups. At step 718, for each time slot group, a probability distributions is calculated, which is used to determine future locations of the mobile device, and thus the user.

FIG. 8 illustrates a flowchart of a method 800 for location prediction based on historical location information, in accordance with an embodiment of the present invention. Initially at step 810, historical location data associated with a particular mobile device is utilized to identify locations where the mobile device has been located within a predetermined period of time. At step 812, the predetermined period of time is divided into time slots. For each time slot, a probability distribution is automatically computed at step 814 by, for example, computing a probability of each identified location for each time slot. The probability distribution represents a probability that the mobile device is located at each identified location throughout the duration of time that comprises each time slot. At step 816, it is determined that a first time slot and a second time slot have similar probability distributions. The first and second time slots are associated at step 818 based on their similar probability distributions to form a first time cluster. For the first time cluster, the probability distribution is automatically computed at step 820, representing the probability that the mobile device is located at each location throughout the duration of the time slots that comprise the first time cluster. The probability distribution of the first time cluster is used to predict future locations of a user by way of the mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, enable a computing device to perform a method of predicting a future location based on time clustering, the method comprising:
   providing location data for a particular mobile device over a predetermined period of time;
   identifying one or more locations from the location data;
   dividing the predetermined period of time into a plurality of time slots;
   for each of the plurality of time slots, automatically calculating a probability distribution representing a probability that the mobile device is located at each of the one or more locations;
   determining from the plurality of time slots that one or more first time slots and one or more second time slots have similar probability distributions;
   based on the similar probability distributions, clustering the plurality of time slots into one or more time-slot groups, wherein clustering includes associating the one or more first time slots with the one or more second time slots to form the one or more time-slot groups; and
   for each of the one or more time-slot groups, automatically calculating the probability distribution representing the probability that the mobile device is located at each of the one or more locations, wherein at least one of the one or more locations is a future location.

2. The media of claim 1, wherein each of the plurality of time slots are one hour in duration.

3. The media of claim 1, wherein the location data is provided by one or more of a global positioning system (GPS), an assisted GPS (AGPS), or network measurements.

4. The media of claim 1, wherein the predetermined period of time is five days, six days, or seven days.

5. The media of claim 1, wherein the probability distribution calculated for each of the one or more time-slot groups is used to predict future locations of the mobile device.

6. The media of claim 5, wherein a maximum likelihood estimation is used to predict the future locations of the mobile device.

7. The media of claim 1, wherein the one or more time-slot groups include work hours of weekdays, non work hours of weekdays, and weekends.

8. The media of claim 1, wherein identifying one or more locations from the location data further comprises:
   grouping one or more geographical points of the location data together based on their respective location; and
   determining a geographical place that represents each group of the one or more geographical points such that the geographical place corresponds to one of the one or more locations.

9. The media of claim 1, further comprising associating a first time slot and a second time slot of the plurality of time slots to form a first of the one or more time-slot groups.

10. One or more non-transitory computer-readable media having computer-executable instructions embodied thereon that, when executed, enable a computing device to perform a method of predicting a future location based on time clustering, the method comprising:
   receiving location data for a particular mobile device, the location data corresponding to a predetermined period of time;
   dividing the location data into one or more location groups, wherein each of the one or more location groups represents a unique location where the mobile device was located during the predetermined period of time;
   dividing the predetermined period of time into two or more time slots;
   determining from the two or more time slots that one or more first time slots and one or more second time slots have similar probability distributions;
   based on the similar probability distributions, clustering the two or more time slots into one or more time-slot groups,
      wherein the clustering includes associating the one or more first time slots with the one or more second time slots to form the one or more time-slot groups,
      wherein the one or more time-slot groups include typical work hours of weekdays, non work hours of weekdays, and weekends; and
   for each of the one or more time-slot groups, automatically calculating the probability distribution representing the probability that the mobile device will be in each of the unique locations during the times in each of the one or more time-slot groups, wherein at least one of the unique locations is a future location.

11. The media of claim 10, wherein the location data is received from a service provider associated with the mobile device, and wherein the location data is collected from one or more of GPS, AGPS, or network measurements.

12. The media of claim 10, wherein dividing the location data into one or more location groups further comprises spatially clustering data points from the location data to identify the one or more location groups.

13. The media of claim 10, wherein each of the time-slot groups comprises at least one time slot.

14. The media of claim 13, wherein the at least one time slot comprising each of the time-slot groups has a similar probability distribution to other time slots in the time slot group.

15. A method for predicting a future location based on time clustering, the method comprising:
   utilizing historical location data associated with a particular mobile device to identify a plurality of locations where the mobile device has been located within a predetermined period of time;
   dividing the predetermined period of time into a plurality of time slots;
   for each time slot, automatically computing a probability distribution representing a probability that the mobile device is located at each of the plurality of locations throughout a duration of the time slot;
   determining that a first time slot and a second time slot have a similar probability distribution;
   associating the first time slot with the second time slot based on the similar probability distribution to create a first time cluster; and
   for the first time cluster, automatically computing the probability distribution representing the probability that the mobile device is located at each of the plurality of locations throughout the duration of the time slots that comprise the first time cluster, wherein the probability distribution of the first time cluster is used to predict future locations of a user by way of the mobile device, wherein at least one of the plurality of locations is a future location.

16. The media of claim 15, further comprising receiving the historical location data corresponding to the mobile device, wherein the historical location data is provided by one or more of a GPS, an AGPS, or network measurements.

17. The media of claim 15, wherein the probability distribution calculated for the first time cluster is used to predict future locations of the mobile device.

18. The media of claim 17, wherein a maximum likelihood estimation is used to predict the future locations of the mobile device.

19. The media of claim 15, wherein the probability distributions are computed by an algorithm.

\* \* \* \* \*